US011582454B2

(12) United States Patent
Lai et al.

(10) Patent No.: US 11,582,454 B2
(45) Date of Patent: Feb. 14, 2023

(54) METHOD AND APPARATUS OF THE QUANTIZATION MATRIX COMPUTATION AND REPRESENTATION FOR VIDEO CODING

(71) Applicant: MEDIATEK INC., Hsinchu (TW)

(72) Inventors: Chen-Yen Lai, Hsinchu (TW);
Tzu-Der Chuang, Hsinchu (TW);
Ching-Yeh Chen, Hsinchu (TW);
Chih-Wei Hsu, Hsinchu (TW);
Yu-Wen Huang, Hsinchu (TW); Olena Chubach, San Jose, CA (US)

(73) Assignee: HFI INNOVATION INC., Zhubei (TW)

( * ) Notice: Subject to any disclaimer, the term of this patent is extended or adjusted under 35 U.S.C. 154(b) by 0 days.

(21) Appl. No.: 17/441,795

(22) PCT Filed: Mar. 23, 2020

(86) PCT No.: PCT/CN2020/080705
§ 371 (c)(1),
(2) Date: Sep. 22, 2021

(87) PCT Pub. No.: WO2020/192633
PCT Pub. Date: Oct. 1, 2020

(65) Prior Publication Data
US 2022/0094936 A1  Mar. 24, 2022

Related U.S. Application Data

(60) Provisional application No. 62/961,589, filed on Jan. 15, 2020, provisional application No. 62/960,552, (Continued)

(51) Int. Cl.
*H04N 19/126* (2014.01)
*H04N 19/132* (2014.01)
(Continued)

(52) U.S. Cl.
CPC ......... *H04N 19/126* (2014.11); *H04N 19/132* (2014.11); *H04N 19/176* (2014.11);
(Continued)

(58) Field of Classification Search
None
See application file for complete search history.

(56) References Cited

U.S. PATENT DOCUMENTS

| 10,742,982 B2 | 8/2020 | Wang et al. |
| 2005/0111554 A1 | 5/2005 | Zhou |

(Continued)

FOREIGN PATENT DOCUMENTS

CN  103096056 A  5/2013

OTHER PUBLICATIONS

International Search Report dated Jul. 3, 2020, issued in application No. PCT/CN2020/080705.
(Continued)

*Primary Examiner* — Michael J Hess
(74) *Attorney, Agent, or Firm* — McClure, Qualey & Rodack, LLP

(57) ABSTRACT

A method and apparatus for video coding utilizing a current block, a maximum side of the transform block of the current block corresponds to 64. A scaling matrix is derived from elements of an 8×8 base scaling matrix, where the elements in a bottom-right 4×4 region of the 8×8 base scaling matrix are skipped, either not signaled or set to zero. According to another method, a current block belongs to a current picture in a first color format that has only a first color component. A first scaling matrix is signaled at the video encoder side or parsed at the video decoder side for the first color component of the current block. Signaling any second scaling matrix is disabled at the video encoder side or parsing any second
(Continued)

scaling matrix is disabled at the video decoder side for a second or third color component of the current block.

15 Claims, 8 Drawing Sheets

Related U.S. Application Data filed on Jan. 13, 2020, provisional application No. 62/823,605, filed on Mar. 25, 2019.

(51) Int. Cl.
*H04N 19/176* (2014.01)
*H04N 19/18* (2014.01)
*H04N 19/186* (2014.01)
*H04N 19/61* (2014.01)
*H04N 19/70* (2014.01)

(52) U.S. Cl.
CPC ........... *H04N 19/18* (2014.11); *H04N 19/186* (2014.11); *H04N 19/61* (2014.11); *H04N 19/70* (2014.11)

(56) References Cited

U.S. PATENT DOCUMENTS

| | | | |
|---|---|---|---|
| 2005/0163214 A1 | 7/2005 | Yachida | |
| 2012/0140815 A1* | 6/2012 | Zhou | H04N 19/176 375/240.03 |
| 2013/0182755 A1* | 7/2013 | Chen | H04N 19/463 375/240.01 |
| 2014/0086311 A1* | 3/2014 | Lou | H04N 19/124 375/240.03 |
| 2015/0334396 A1* | 11/2015 | Lim | H04N 19/159 375/240.03 |
| 2017/0237980 A1* | 8/2017 | Han | H04N 19/115 375/240.18 |
| 2017/0324958 A1* | 11/2017 | Tandon | H04N 19/625 |
| 2018/0084284 A1* | 3/2018 | Rosewarne | H04N 19/96 |
| 2018/0176564 A1* | 6/2018 | Panusopone | H04N 19/124 |
| 2018/0278934 A1* | 9/2018 | Andersson | H04N 19/126 |
| 2018/0302621 A1* | 10/2018 | Fu | H04N 19/463 |
| 2018/0309991 A1 | 10/2018 | Thiagarajan et al. | |
| 2018/0376153 A1* | 12/2018 | Gokhale | H04N 19/147 |
| 2019/0082194 A1 | 3/2019 | Chang | |
| 2019/0261016 A1* | 8/2019 | Liu | G06T 7/11 |
| 2020/0128243 A1* | 4/2020 | Wang | H04N 19/159 |
| 2021/0006796 A1* | 1/2021 | Tsukuba | H04N 19/463 |
| 2021/0344921 A1* | 11/2021 | Kim | H04N 19/184 |
| 2021/0368172 A1* | 11/2021 | Lim | H04N 19/503 |

OTHER PUBLICATIONS

Bross, B., et al.; "Versatile Video Coding (Draft 3);" Joint Video Experts Team (JVET) of ITU-T SG 16 WP 3 and ISO/IEC JTC 1/SC 29/WG 11; Oct. 2018; pp. 1-236.

Chinese language office action dated Aug. 4, 2021, issued in application No. TW 109109952.

International Telecommunication Union; "Series H: Audiovisual and Multimedia Systems; Infrastructure of audiovisual services—Coding of moving video; High efficiency video coding;" Dec. 2016; pp. 1-664.

European Search Report dated Oct. 27, 2022, issued in application No. EP 20780079.8.

Anonymous; "High Efficiencey video coding, ITU-T, vol. 265 series H: Audiovisual and Multimedia Systems Infrastructure of audiovisual services? Coding of moving video;" Feb. 2018; pp. 1-692.

Chubach, O., et al.; "CE7-related: Support of quantization matrices for VVC;" Joint Video Experts Team (JVET) of ITU-T SG 16 WP 3 and ISO/IEC JTC 1/SC 29/WG 11; Mar. 2019; pp. 1-4.

Chen, J., et al.; "Algorithm description for Versatile Video Coding and Test Model 4 (VTM 4);" Joint Video Experts Team (JVET) of ITU-T SG 16 WP 3 and ISO/IEC JTC 1/SC 29/WG 11; Mar. 2019; pp. 1-62.

* cited by examiner $$\begin{bmatrix} 16 & 16 & 16 & 16 \\ 16 & 16 & 16 & 16 \\ 16 & 16 & 16 & 16 \\ 16 & 16 & 16 & 16 \end{bmatrix} \swarrow 310$$

Default 4x4 for IntraLuma, IntraCb, IntraCr, InterLuma, InterCb, InterCr $$\begin{bmatrix} 16 & 16 & 16 & 16 & 17 & 18 & 21 & 24 \\ 16 & 16 & 16 & 16 & 17 & 19 & 22 & 25 \\ 16 & 16 & 17 & 18 & 20 & 22 & 25 & 29 \\ 16 & 16 & 18 & 21 & 24 & 27 & 31 & 36 \\ 17 & 17 & 20 & 24 & 30 & 35 & 41 & 47 \\ 18 & 19 & 22 & 27 & 35 & 44 & 54 & 65 \\ 21 & 22 & 25 & 31 & 41 & 54 & 70 & 88 \\ 24 & 25 & 29 & 36 & 47 & 65 & 88 & 115 \end{bmatrix} \swarrow 320$$

Default 8x8 for IntraLuma, IntraCb, IntraCr $$\begin{bmatrix} 16 & 16 & 16 & 16 & 17 & 18 & 20 & 24 \\ 16 & 16 & 16 & 17 & 18 & 20 & 24 & 25 \\ 16 & 16 & 17 & 18 & 20 & 24 & 25 & 28 \\ 16 & 17 & 18 & 20 & 24 & 25 & 28 & 33 \\ 17 & 18 & 20 & 24 & 25 & 28 & 33 & 41 \\ 18 & 20 & 24 & 25 & 28 & 33 & 41 & 54 \\ 20 & 24 & 25 & 28 & 33 & 41 & 54 & 71 \\ 24 & 25 & 28 & 33 & 41 & 54 & 71 & 91 \end{bmatrix} \swarrow 330$$

Default 8x8 for InterLuma, InterCb, InterCr

*Fig. 3*

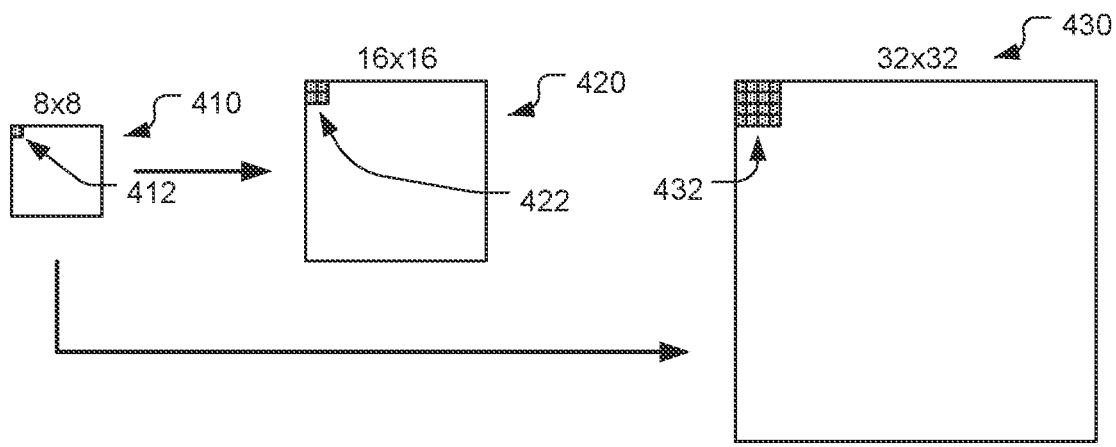

*Fig. 4*

METHOD AND APPARATUS OF THE QUANTIZATION MATRIX COMPUTATION AND REPRESENTATION FOR VIDEO CODING

CROSS REFERENCE TO RELATED APPLICATIONS

The present invention claims priority to U.S. Provisional Patent Application, Ser. No. 62/823,605, filed on Mar. 25, 2019, U.S. Provisional Patent Application, Ser. No. 62/960,552, filed on Jan. 13, 2020 and U.S. Provisional Patent Application, Ser. No. 62/961,589, filed on Jan. 15, 2020. The U.S. Provisional Patent Applications are hereby incorporated by reference in their entireties.

FIELD OF THE INVENTION

The present invention relates to transform coefficient coding for video coding. In particular, the present invention discloses quantization matrix derivation and representation.

BACKGROUND AND RELATED ART

Adaptive Intra/Inter video coding has been widely used in various video coding standards, such as MPEG-2, AVC (advanced video coding) and HEVC (High Efficiency Video Coding). In adaptive Intra/Inter video coding, an input signal is predicted by Intra/Inter predictor to generate prediction residues. The residues are often processed by a two-dimensional transform and quantized. The quantized transform coefficients are then coded. The High Efficiency Video Coding (HEVC) standard is developed under the joint video project of the ITU-T Video Coding Experts Group (VCEG) and the ISO/IEC Moving Picture Experts Group (MPEG) standardization organizations, and is especially with partnership known as the Joint Collaborative Team on Video Coding (JCT-VC). In HEVC, one slice is partitioned into multiple coding tree units (CTU). In main profile, the minimum and the maximum sizes of CTU are specified by the syntax elements in the sequence parameter set (SPS). The allowed CTU size can be 8×8, 16×16, 32×32, or 64×64. For each slice, the CTUs within the slice are processed according to a raster scan order.

The CTU is further partitioned into multiple coding units (CU) to adapt to various local characteristics. A CTU can be further partitioned into multiple Coding Units (CUs) through Quad-Tree or Quadtree (QT) partitioning. The QT partition splits a block of size 4N×4N into 4 equal-size 2N×2N sub-blocks. The CTU can be a single CU (i.e., no splitting) or can be split into four smaller units of equal size, which correspond to the nodes of the coding tree. If units are leaf nodes of the coding tree, the units become CUs. Otherwise, the quadtree splitting process can be iterated until the size for a node reaches a minimum allowed CU size as specified in the SPS (Sequence Parameter Set).

According to HEVC, each CU can be partitioned into one or more prediction units (PU). Coupled with the CU, the PU works as a basic representative block for sharing the prediction information. Inside each PU, the same prediction process is applied and the relevant information is transmitted to the decoder on a PU basis. A CU can be split into one, two or four PUs according to the PU splitting type. HEVC defines eight shapes for splitting a CU into PU, including 2N×2N, 2N×N, N×2N, N×N, 2N×nU, 2N×nD, nL×2N and nR×2N partition types. Unlike the CU, the PU may only be split once according to HEVC.

After obtaining the residual block by the prediction process based on PU splitting type, the prediction residues of a CU can be partitioned into transform units (TU) according to another quadtree structure which is analogous to the coding tree for the CU. The TU is a basic representative block having residual or transform coefficients for applying the integer transform and quantization. For each TU, one integer transform having the same size as the TU is applied to obtain residual coefficients. These coefficients are transmitted to the decoder after quantization on a TU basis.

FIG. 1 illustrates an exemplary adaptive Inter/Intra video coding system incorporating transform and quantization to process prediction residues. For Inter-prediction, Motion Estimation (ME)/Motion Compensation (MC) 112 is used to provide prediction data based on video data from other picture or pictures. Switch 114 selects Intra Prediction 110 or Inter-prediction data and the selected prediction data is supplied to Adder 116 to form prediction errors, also called residues. The prediction error is then processed by Transform (T) 118 followed by Quantization (Q) 120. The transformed and quantized residues are then coded by Entropy Encoder 122 to be included in a video bitstream corresponding to the compressed video data. The bitstream associated with the transform coefficients is then packed with side information such as motion, coding modes, and other information associated with the image area. The side information may also be compressed by entropy coding to reduce required bandwidth. Accordingly, the data associated with the side information are provided to Entropy Encoder 122 as shown in FIG. 1. When an Inter-prediction mode is used, a reference picture or pictures have to be reconstructed at the encoder end as well. Consequently, the transformed and quantized residues are processed by Inverse Quantization (IQ) 124 and Inverse Transformation (IT) 126 to recover the residues. The residues are then added back to prediction data 136 at Reconstruction (REC) 128 to reconstruct video data. The reconstructed video data may be stored in Reference Picture Buffer 134 and used for prediction of other frames.

As shown in FIG. 1, incoming video data undergoes a series of processing in the encoding system. The reconstructed video data from REC 128 may be subject to various impairments due to a series of processing. Accordingly, Loop filter 130 is often applied to the reconstructed video data before the reconstructed video data are stored in the Reference Picture Buffer 134 in order to improve video quality. For example, de-blocking filter (DF) and Sample Adaptive Offset (SAO) have been used in the High Efficiency Video Coding (HEVC) standard. The loop filter may also include ALF (Adaptive Loop Filter). The loop filter information may have to be incorporated in the bitstream so that a decoder can properly recover the required information. Therefore, loop filter information is provided to Entropy Encoder 122 for incorporation into the bitstream. In FIG. 1, Loop filter 130 is applied to the reconstructed video before the reconstructed samples are stored in the reference picture buffer 134. The system in FIG. 1 is intended to illustrate an exemplary structure of a typical video encoder. It may correspond to the High Efficiency Video Coding (HEVC) system or H.264.

FIG. 2 illustrates a system block diagram of a corresponding video decoder for the encoder system in FIG. 1. Since the encoder also contains a local decoder for reconstructing the video data, some decoder components are already used in the encoder except for the entropy decoder 210. Furthermore, only motion compensation 220 is required for the decoder side. The switch 146 selects Intra-prediction or Inter-prediction and the selected prediction data are supplied to reconstruction (REC) 128 to be combined with recovered residues. Besides performing entropy decoding on compressed residues, entropy decoding 210 is also responsible for entropy decoding of side information and provides the side information to respective blocks. For example, Intra mode information is provided to Intra-prediction 110, Inter mode information is provided to motion compensation 220, loop filter information is provided to loop filter 130 and residues are provided to inverse quantization 124. The residues are processed by IQ 124, IT 126 and subsequent reconstruction process to reconstruct the video data. Again, reconstructed video data from REC 128 undergo a series of processing including IQ 124 and IT 126 as shown in FIG. 2 and are subject to coding artefacts. The reconstructed video data are further processed by Loop filter 130.

The quantization matrix (QM) has been used in various video coding standards. For example, the quantization matrix is used for the quantization 120 in FIG. 1 and the inverse quantization 124 in FIG. 2. Block-based hybrid video coding schemes which imply transform coding of the residual signal can use frequency dependent scaling to control the distribution of the quantization distortion across different frequencies in a transform unit (TU). In order to achieve perceptually uniform quantization across spatial frequencies, a quantization matrix can be designed to weight each frequency channel associated with the transform coefficient according to the perceived sensitivity over its related frequency range. Accordingly, low frequency coefficients in the transform block will be quantized with a finer quantization step size compared to high frequency coefficients. The corresponding quantization matrix can be employed to inversely weight de-quantized transform coefficients at the decoder.

Quantization matrix has been successfully utilized in video coding standards, such as H.264/AVC and H.265/HEVC (High Efficiency Video Coding), which allows to improve the subjective quality of video content. Due to their effectiveness, quantization matrices have been widely used in numerous video coding products.

The HEVC specification includes four integer inverse transform matrices of sizes 4×4, 8×8, 16×16, and 32×32. These transform matrices are integer approximations of the DCT-2 matrix of the same size, aiming at the preservation of the DCT (discrete cosine transform) coefficient structure. An additional 4×4 DST (discrete sine transform) matrix is specified which is applied to the residual of Intra predicted 4×4 blocks. For distinction from the DST, the four DCTs are referred to as the HEVC core transforms.

BRIEF SUMMARY OF THE INVENTION

A method and apparatus for video coding are disclosed. According to the present invention, input data related to a current block in a current picture are received, where the input data correspond to a transform block of the current block at a video encoder side and the input data correspond to a decoded-quantized transform block of the current block at a video decoder side, and a maximum side of the transform block of the current block corresponds to 64. A scaling matrix is derived from elements of an 8×8 base scaling matrix, wherein the element in a bottom-right 4×4 region of the 8×8 base scaling matrix are skipped, either not signaled or set to zero. A quantization process is applied to the input data according to the scaling matrix to generate the coded-quantized transform block at the video encoder side or an inverse quantization process is applied to the input data according to the scaling matrix to generate a decoded transform block at the video decoder side.

In one embodiment, when the coded-quantized transform block at the video encoder side or the decoded transform block at the video decoder side is 64×64 in size, the transform block has 32×32 non-zero value elements. In another embodiment, when the coded-quantized transform block at the video encoder side or the decoded transform block at the video decoder side is 64×N or N×64 in size, N being an integer smaller than 64, the transform block has 32×N or N×32 non-zero value elements.

According to another method, input data related to a current block belonging to a current picture in a first color format that has only a first color component are received, where the input data corresponds to a transform block of the current block at a video encoder side and the input data corresponds to a decoded-quantized transform block of the current block at a video decoder side, and the current block corresponds to the first color component associated with the first color format. A first scaling matrix is signaled at the video encoder side or parsed at the video decoder side for the first color component of the current block. On the other hand, signaling any second scaling matrix is disabled at the video encoder side or parsing any second scaling matrix is disabled at the video decoder side for a second or third color component that is absent from the current block. A quantization process is applied to the input data according to the first scaling matrix to generate a coded-quantized transform block at the video encoder side or an inverse quantization process is applied to the input data according to the first scaling matrix to generate a decoded transform block at the video decoder side.

In one embodiment, a flag is signaled in a bitstream to indicate whether said signaling any second scaling matrix at the video encoder side or said parsing any second scaling matrix at the video decoder side for the second or third color component is enabled or disabled. The flag can be signaled in an Adaptation Parameter Set (APS) of the bitstream, where the APS has a type corresponding to scaling list data.

In another embodiment, when a second scaling matrix is not signaled at the video encoder side or not parsed at the video decoder side the first scaling matrix, a pre-defined second scaling matrix is inferred. Furthermore, the pre-defined scaling matrix that is inferred is determined according to syntax elements scaling_list_copy_mode_flag and scaling_list_pred_id_delta. The values of syntax elements scaling_list_copy_mode_flag and scaling_list_pred_id_delta can be inferred at the video decoder side if the values of the syntax elements scaling_list_copy_mode_flag and the scaling_list_pred_id_delta are not received.

In one embodiment, the first color format is a 400 color format, and the first color component is luma component. In another embodiment, the second or third color component comprises a chroma component. In another embodiment, the first scaling matrix can be referenced by another dependent video layer in the 400 color format. In yet another embodiment, whether the current picture is in the 400 color format is indicated by a color format index associated with the current picture.

BRIEF DESCRIPTION OF THE DRAWINGS

FIG. 3 illustrates examples of 4×4 and 8×8 shared based base scaling matrices for deriving larger scaling matrices for luma and chroma components in the Intra and Inter coding modes.

FIG. 4 illustrates an example of deriving the quantization matrices for transform blocks of size 16×16 and 32×32 from a shared based 8×8 quantization matrix of the same type by up-sampling using replication.

DETAILED DESCRIPTION OF THE INVENTION

Figure 1:
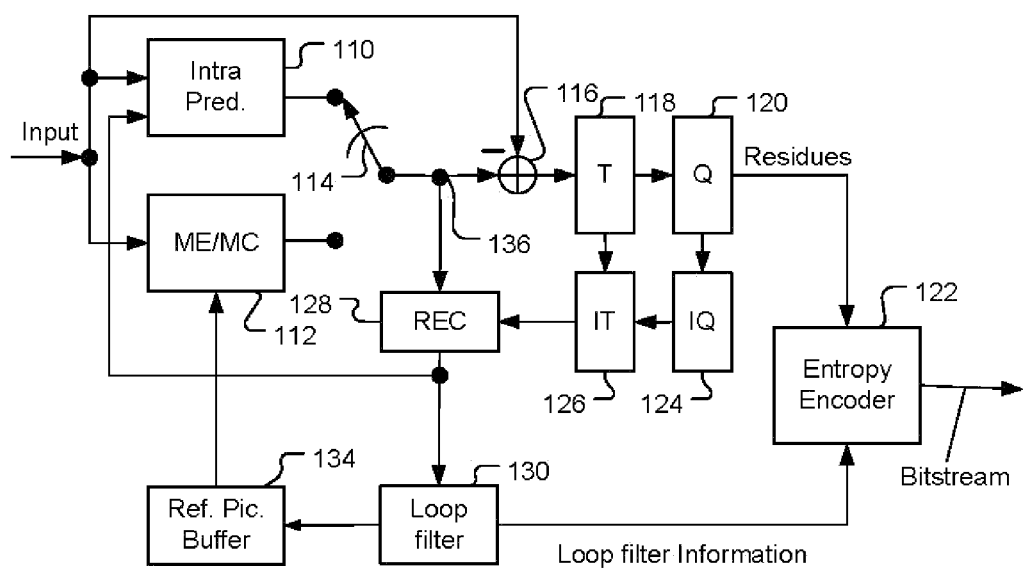
FIG. 1 illustrates an exemplary block diagram of a video encoder, where the video encoder incorporates Intra/Inter prediction, transform and quantization processes.
Figure 2:
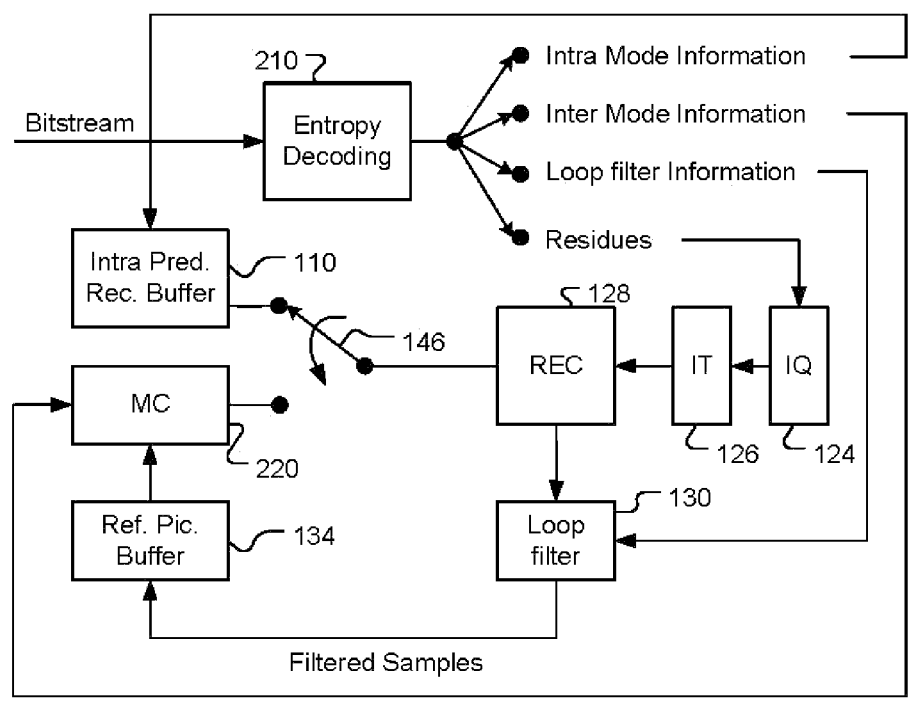
FIG. 2 illustrates an exemplary block diagram of a video decoder, where the video decoder incorporates Intra/Inter prediction, inverse transform and de-quantization processes.

In one embodiment, the first color format is a 4:0:0 color format, and the first color component is luma component. In another embodiment, the second or third color component comprises a chroma component. In another embodiment, the first scaling matrix can be referenced by another dependent video layer in the 4:0:0 color format. In yet another embodiment, whether the current picture is in the 4:0:0 color format is indicated by a color format index associated with the current picture.

Default Quantization Matrices Representation

Quantization matrix is being evaluated for adoption in the emerging new video coding standard, named VVC (Versatile Video Coding) as a next generation video coding standard and a successor to H.265/HEVC. The quantization matrix is also called scaling matrix in this disclosure.

When frequency dependent scaling is enabled, the quantization matrices of sizes 4×4 and 8×8 have default values as shown in FIG. 3. As shown in FIG. 3, 4×4 matrix 310 is used for luma and chroma components in the Intra and Inter modes, 8×8 matrix 320 is used for luma and chroma components in the Intra mode, and 8×8 matrix 330 is used for luma and chroma components in the Inter mode.

For example, the following 20 quantization matrices are supported for different sizes and types of the transform block:

Luma: Intra4×4, Inter4×4, Intra8×8, Inter8×8, Intra16×16, Inter16×16, Intra32×32, Inter32×32
Cb: Intra4×4, Inter4×4, Intra8×8, Inter8×8, Intra16×16, Inter16×16
Cr: Intra4×4, Inter4×4, Intra8×8, Inter8×8, Intra16×16, Inter16×16

In order to reduce the memory needed to store the quantization matrices, 8×8 matrices are used to generate 16×16 and 32×32 quantization matrices. The default quantization matrices for transform blocks of size 16×16 and 32×32 are obtained from the default 8×8 quantization matrices of the same type by up-sampling using replication. This procedure is shown in FIG. 4: the dot-filled block 412 in the figure indicate that a quantization matrix entry in the 8×8 quantization matrix 410 is replicated into a 2×2 region 422 in the 16×16 quantization matrix 420 and into a 4×4 region 432 in the 32×32 quantization matrix 430.

Adaptive Multiple Core Transform

Figure 5:
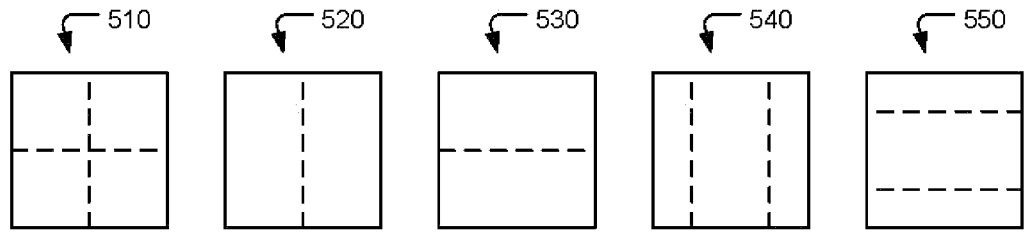
FIG. 5 illustrates examples of supported splits in VVC, including quad-split, vertical binary split, horizontal binary-split, vertical center-side ternary-split and horizontal center-side ternary-split.

The new standard under development, VVC (Versatile Video Codec), is supporting more partition shapes compared to HEVC. A so-called multi-type tree (MTT) partitioning is proposed, where in addition to quad-tree (QT) structure supported in HEVC, binary and ternary splits are added. All supported splits in VVC are shown in FIG. 5, including quad-split 510, vertical binary split 520, horizontal binary-split 530, vertical center-side ternary-split 540 and horizontal center-side ternary-split 550.

In MTT, the tree structure is coded separately for luma and chroma in I slices, and applied simultaneously to both luma and chroma (except for certain minimum sizes constraint for chroma) in P and B slices. This means that in I slice the luma CTB has its MTT-structured block partitioning, and the two chroma CTBs may have another MTT-structured block partitioning. Also, in order to increase coding gain for higher resolution videos, ternary (TT) and binary (BT) splits can be applied to 128×128 luma/64×64 chroma coding tree blocks (CTBs) recursively. In addition, the maximum supported size of the TU is increased to 64×64 luma/32×32 chroma.

Adaptive Multiple Transform (AMT) scheme is used for residual coding for both inter and intra coded blocks in VTM (VVC test model). Multiple selected transforms from the DCT/DST families other than the current transforms in HEVC are applied to the residual blocks. Lately, transform matrices of DST-7, DCT-8 and DST-1 have been introduced. Table 1 shows the basis functions of the selected DST/DCT.

TABLE 1

Transform basis functions of DCT/DSTs for N-point input

| Transform Type | Basis function $T_i(j)$, i, j = 0, ..., N − 1 |
|---|---|
| DCT-8 | $T_i(j) = \sqrt{\dfrac{4}{2N+1}} \cdot \cos\left(\dfrac{\pi \cdot (2i+1) \cdot (2j+1)}{4N+2}\right)$ |
| DST-1 | $T_i(j) = \sqrt{\dfrac{2}{N+1}} \cdot \sin\left(\dfrac{\pi \cdot (i+1) \cdot (j+1)}{N+1}\right)$ |
| DST-7 | $T_i(j) = \sqrt{\dfrac{4}{2N+1}} \cdot \sin\left(\dfrac{\pi \cdot (2i+1) \cdot (j+1)}{2N+1}\right)$ |

The AMT is applied to the CUs with both width and height smaller than or equal to 64, and whether AMT applies or not is controlled by a CU level flag. When the CU level flag is equal to 0, DCT-2 is applied in the CU to encode the residue. For a luma coding block within the AMT enabled CU, two additional flags are signaled to identify the horizontal and vertical transform to be used. As in HEVC, the residual of a block can be coded with transform skip mode in the VTM. To avoid the redundancy of syntax coding, the transform skip flag is not signaled when the CU level AMT flag is not equal to zero.

For Intra residue coding, due to the different residual statistics of different Intra prediction modes, a mode-dependent transform candidate selection process is used. One embodiment of the three defined transform subsets is shown in Table 2. The transform subset may be selected based on the Intra prediction mode.

TABLE 2

Three pre-defined transform candidate sets

| Transform Set | Transform Candidates |
|---|---|
| 0 | DST-7, DCT-8 |
| 1 | DST-7, DST-1 |
| 2 | DST-7, DCT-8 |

With the subset concept, transform subsets are first identified based on Table 2 using the Intra prediction mode of a CU with the CU-level AMT flag is equal to 1. After that, for each of the horizontal and vertical transforms, one of the two transform candidates in the identified transform subset, can be selected and explicitly signaled with flags.

In case of Inter prediction residual, only one transform set, which consists of DST-7 and DCT-8, can be used for all Inter modes and for both horizontal and vertical transforms.

Furthermore, DCT-8 is known to have the following relationship with DST-7:

$$C_N^{VIII} = J_N S_N^{VIII} D_N \quad (1)$$

$$[J_N]_{ij}, i, j = 0, \ldots, N-1 = \begin{cases} 1, & j = N-1-i \\ 0, & \text{otherwise} \end{cases}$$

$$[D_N]_{ij}, i, j = 0, \ldots, N-1 = \text{diag}((-1)^k),$$

$$k = 0, \ldots, N-1 = \begin{cases} (-1)^i, & i = j \\ 0, & i \neq j \end{cases}$$

The $C_N^{VIII}$ and $S_N^{VII}$ in Equation (1) are inverse transform matrices for DCT-8 and DST-7, and i and j are row and column indices, respectively. In Equation (1), $J_N$ is the matrix represented by 1s along its anti-diagonal line, and the matrix $D_N$ alternates between 1 and −1 on its diagonal line. Therefore, DCT8 can be derived from DST7 with sign changes and reordering just before and after the DST7 computation. Hence, DST7 is reused in this implementation for DCT8. The sign changes and shuffling do not add any additional overhead to DST7, so that the computational complexity of DCT8 is identical to that of DST7. This avoids the usage of any additional memory in DCT8 and DST-1.

Since more block sizes and AMT are supported in VVC, a more efficient quantization matrix representation method is required in VTM.

According to the present invention, the default quantization matrices of size M×N are first defined and stored with a specified coefficient at each position for M×N transform unit, where M and N can be any even number between 2 and 64. In one embodiment, there can be three quantization/scaling matrices: one of size M=N=4 (for residual blocks of size 4×4, both Intra and Inter predictions) and two of size M=N=8 (one for Intra prediction and another one for Inter prediction). As an example, the corresponding matrices (310, 320 and 330) in FIG. 3 can be used as the default quantization matrices. In another embodiment, only default matrices for Intra prediction can be defined (e,g, for sizes 4×4 and 8×8), while quantization matrices for Inter prediction can be obtained from the corresponding matrices for Intra prediction.

In another embodiment, the default M×N quantization matrices are defined and stored, which are used to derive the default $2^p \times 2^k$ quantization matrices for $2^p \times 2^k$ transform units, where p and k can take any value between 1 and 6. For example, k=p=4, k=p=5 or k=p=6, which would give sizes 16×16, 32×32, and 64×64.

After the default quantization matrices are defined and stored, a method (e.g., coefficient mapping and interpolation (named as coefficient mapping and interpolation step) including simple zero order interpolation method that uses repetition and linear interpolation based up-sampling) to generate the default quantization matrix for $2^p \times 2^k$ (e.g. 4×4, 4×8, 8×4, 8×8, 4×16, 16×4, 4×32, 32×4, 8×16, 16×8, 16×16, 8×32, 32×8, 16×32, 32×16, 32×32, 16×64, 64×16, 32×64, 64×32, 64×64) transformed block from the default M×N quantization matrices.

Figure 6:
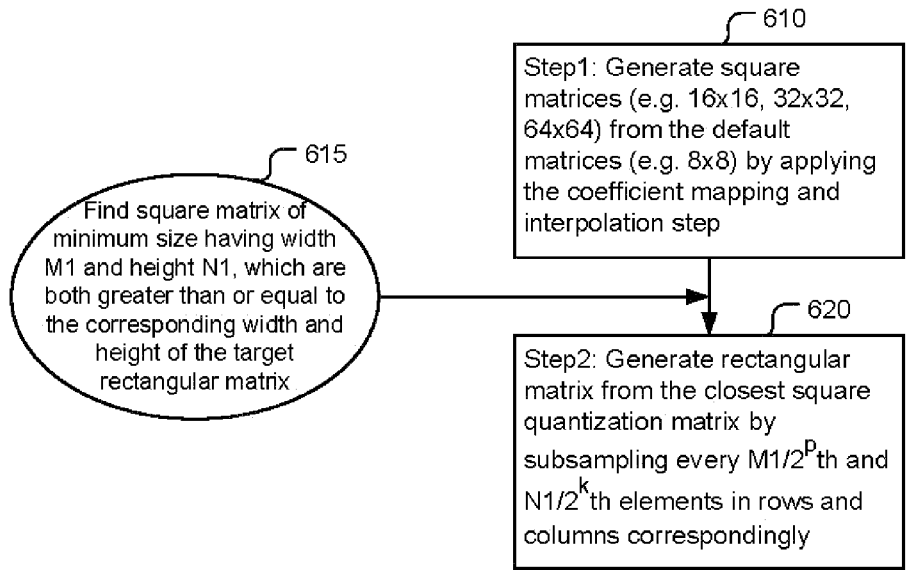
FIG. 6 illustrates one example of deriving a rectangular scaling matrix from a shared based 8×8 quantization matrix.
Figure 7:
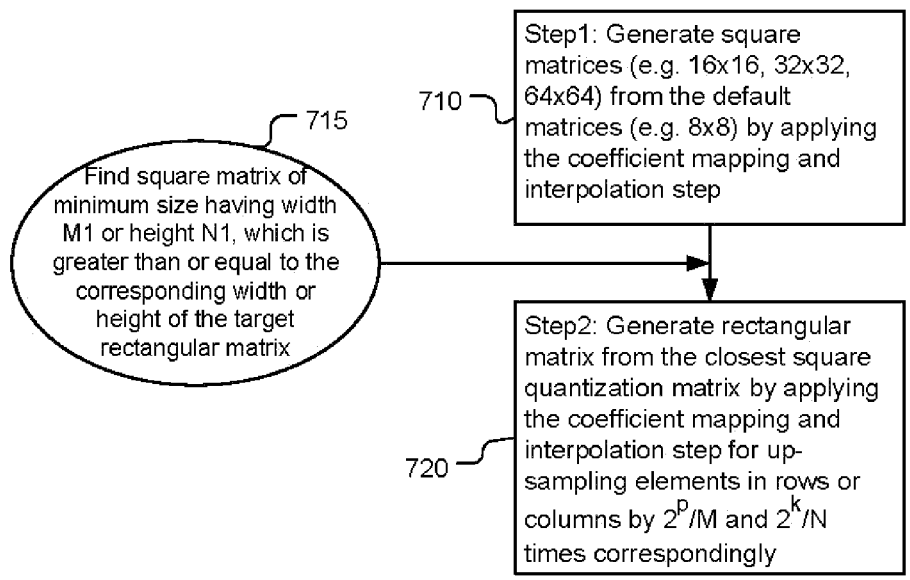
FIG. 7 illustrates another example of deriving a rectangular scaling matrix from a shared based 8×8 quantization matrix.
Figure 8:
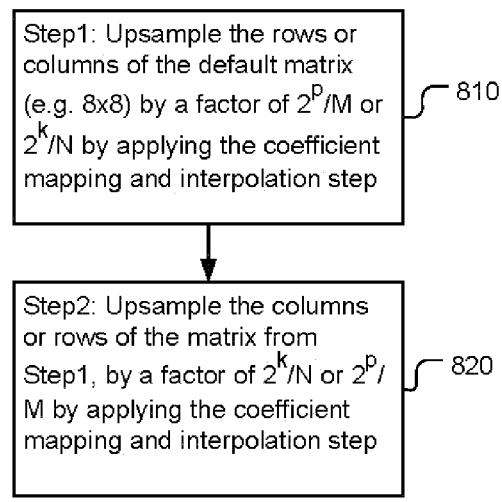
FIG. 8 illustrates yet another example of deriving a rectangular scaling matrix from a shared based 8×8 quantization matrix.

The following flowcharts show three possible embodiments for defining matrices with a block size corresponding to $2^p \times 2^k$. In one embodiment, in FIG. 6 for example, for step 1 (610), at first, several square matrices (e.g. 16×16, 32×32, 64×64) are generated from the default matrices (e.g. 8×8) by applying the coefficient mapping and interpolation step. In step 2 (620), rectangular matrix is generated from the closest square quantization matrix by subsampling every M1/$2^p$th and N1/$2^k$th elements in rows and columns correspondingly. The square matrix of minimum size with width M1 and height N1 is determined step 615, which are greater than or equal to both the corresponding width and height of the target rectangular matrix. For example, M1 and N1 can be equal to M. Thus, the closest square quantization matrix is M×M. In other examples, M1 may not be equal to N1, if the minimum size is M among M1 and N1, then closest square matrix is M×M. In FIG. 7, for step 1 (710), square matrices (e.g. 16×16, 32×32, 64×64) are generated from the default matrices (e.g. 8×8) by applying the coefficient mapping and interpolation step. In step 2 (720), rectangular matrix is generated from the closest square quantization matrix by applying the coefficient mapping and interpolation step for up-sampling elements in rows or columns by $2^p$/M and $2^k$/N times correspondingly. The square matrix of minimum size with width M1 or height N1 is determined step 715, which are greater than or equal to the corresponding width or height of the target rectangular matrix. In FIG. 8, for step 1 (810), the rows or columns of the default matrix (e.g. 8×8) are up-sampled by a factor of $2^p$/M or $2^k$/N by applying the coefficient mapping and interpolation step. In step 2 (820), the columns or rows of the matrix from step1 810, are up-sampled by a factor of $2^k$/N or $2^p$/M by applying the coefficient mapping and interpolation step.

In yet another embodiment, it is possible to up-sample the M×N matrices in a small interval for low frequency coefficients and up-sample the M×N matrices in a big interval for high frequency coefficients.

Figure 9:
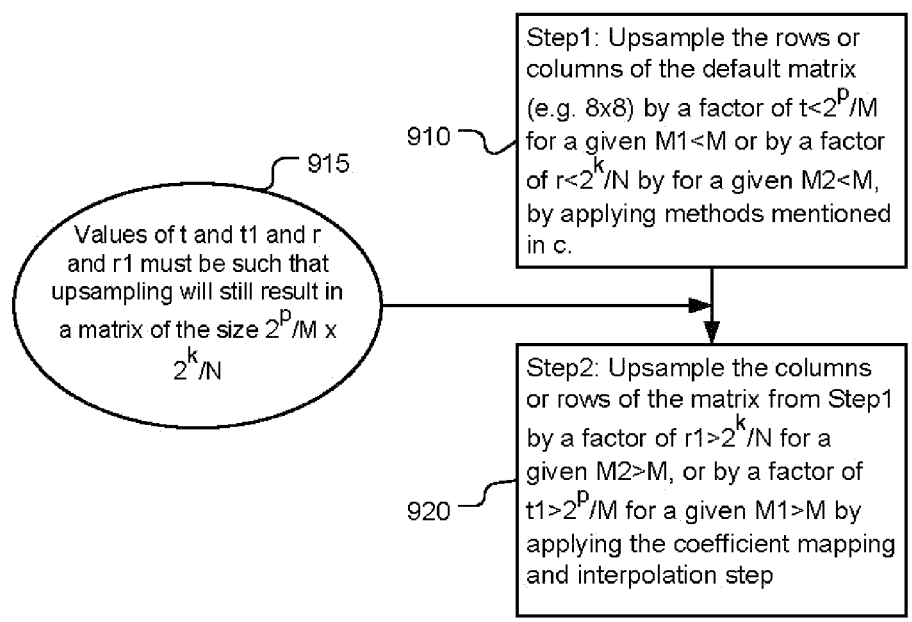
FIG. 9 illustrates yet another example of deriving a rectangular scaling matrix from a shared based 8×8 quantization matrix.

An example is shown in FIG. 9. In FIG. 9, for step 1 (910), the rows or columns of the base scaling matrix (e.g. 8×8) are up-sampled by a factor of t<$2^p$/M for a given M1<M or by a factor of r<$2^k$/N for a given M2<M, by applying the coefficient mapping and interpolation step. In step 2 (920), the columns or rows of the matrix from step1 910 are up-sampled by a factor of r1>$2^k$/N for a given M2>M, or by a factor of t1>$2^p$/M for a given M1>M by applying the coefficient mapping and interpolation step. The values of t and t1 and r and r1 are determined in step 915, where these values must be such that up-sampling will still result in a matrix of the size $2^p/M \times 2^k/N$.

As an example, the 8×8 quantization matrix (base scaling matrix) for IntraLuma, IntraCb, IntraCr can be used for obtaining the 16×16 quantization matrix InterLuma, InterCb, InterCr for 16×16 transform units. For obtaining the first quantization matrix, up-sampling by a factor of 2 is applied in the horizontal and vertical directions. This will result in following 16×16 quantization matrix:

$$\begin{bmatrix} 16 & 16 & 16 & 16 & 16 & 16 & 16 & 17 & 17 & 18 & 18 & 20 & 21 & 24 & 24 \\ 16 & 16 & 16 & 16 & 16 & 16 & 16 & 17 & 17 & 18 & 18 & 20 & 20 & 24 & 24 \\ 16 & 16 & 16 & 16 & 16 & 16 & 17 & 17 & 18 & 18 & 20 & 20 & 24 & 24 & 25 & 25 \\ 16 & 16 & 16 & 16 & 16 & 16 & 17 & 17 & 18 & 18 & 20 & 20 & 24 & 24 & 25 & 25 \\ 16 & 16 & 16 & 16 & 17 & 17 & 18 & 18 & 20 & 20 & 24 & 24 & 25 & 25 & 28 & 28 \\ 16 & 16 & 16 & 16 & 17 & 17 & 18 & 18 & 20 & 20 & 24 & 24 & 25 & 25 & 28 & 28 \\ 16 & 16 & 17 & 17 & 18 & 18 & 20 & 20 & 24 & 24 & 25 & 25 & 28 & 28 & 33 & 33 \\ 16 & 16 & 17 & 17 & 18 & 18 & 20 & 20 & 24 & 24 & 25 & 25 & 28 & 28 & 33 & 33 \\ 17 & 17 & 18 & 18 & 20 & 20 & 24 & 24 & 25 & 25 & 28 & 28 & 33 & 33 & 41 & 41 \\ 17 & 17 & 18 & 18 & 20 & 20 & 24 & 24 & 25 & 25 & 28 & 28 & 33 & 33 & 41 & 41 \\ 18 & 18 & 20 & 20 & 24 & 24 & 25 & 25 & 28 & 28 & 33 & 33 & 41 & 41 & 54 & 54 \\ 18 & 18 & 20 & 20 & 24 & 24 & 25 & 25 & 28 & 28 & 33 & 33 & 41 & 41 & 54 & 54 \\ 20 & 20 & 24 & 24 & 25 & 25 & 28 & 28 & 33 & 33 & 41 & 41 & 54 & 54 & 71 & 71 \\ 20 & 20 & 24 & 24 & 25 & 25 & 28 & 28 & 33 & 33 & 41 & 41 & 54 & 54 & 71 & 71 \\ 24 & 24 & 25 & 25 & 28 & 28 & 33 & 33 & 41 & 41 & 54 & 54 & 71 & 71 & 91 & 91 \\ 24 & 24 & 25 & 25 & 28 & 28 & 33 & 33 & 41 & 41 & 54 & 54 & 71 & 71 & 91 & 91 \end{bmatrix}$$

As another example, the 8×8 quantization matrix (base scaling matrix) for IntraLuma, IntraCb, IntraCr can be used for obtaining 8×16 quantization matrix for 8×16 transform blocks. For obtaining the second quantization matrix, up-sampling would be applied only to columns. This will result in following 8×16 quantization matrix:

$$\begin{bmatrix} 16 & 16 & 16 & 16 & 16 & 16 & 16 & 17 & 17 & 18 & 18 & 20 & 21 & 24 & 24 \\ 16 & 16 & 16 & 16 & 16 & 16 & 17 & 17 & 18 & 18 & 20 & 20 & 24 & 25 & 25 \\ 16 & 16 & 16 & 16 & 17 & 17 & 18 & 18 & 20 & 20 & 24 & 24 & 25 & 25 & 28 & 28 \\ 16 & 16 & 17 & 17 & 18 & 18 & 20 & 20 & 24 & 24 & 25 & 25 & 28 & 28 & 33 & 33 \\ 17 & 17 & 18 & 18 & 20 & 20 & 24 & 24 & 25 & 25 & 28 & 28 & 33 & 33 & 41 & 41 \\ 18 & 18 & 20 & 20 & 24 & 24 & 25 & 25 & 28 & 28 & 33 & 33 & 41 & 41 & 54 & 54 \\ 20 & 20 & 24 & 24 & 25 & 25 & 28 & 28 & 33 & 33 & 41 & 41 & 54 & 54 & 71 & 71 \\ 24 & 24 & 25 & 25 & 28 & 28 & 33 & 33 & 41 & 41 & 54 & 54 & 71 & 71 & 91 & 91 \end{bmatrix}$$

In one embodiment, a method according to the present invention may use linear combination of corresponding coefficients, matrix multiplication, linear/nonlinear regression, etc. to generate the quantization matrix for different transformed blocks obtained by applying AMT from the default M×N quantization matrices.

In another embodiment, a method according to the present invention may use linear combination of corresponding coefficients, matrix multiplication, linear/nonlinear regression, etc. to generate the quantization matrix for Intra transform blocks from the default M×N quantization matrices.

In yet another embodiment, a method according to the present invention may use a method to signal the default quantization matrix for different transformed blocks obtained by applying AMT.

Customized Quantization Matrices Representation

In one embodiment, the user defined M×N quantization matrices with a specified coefficient in each position are defined and sent for M×N transform unit with lossless entropy coding. The M and N can be any even number between 2 and 64.

In one embodiment, the user-defined quantization matrices of size M×N are not defined (or sent) for a certain color component of sequences (e.g. YUV 4:4:4 or YCbCr 4:4:4 format) or 4:2:0 format. In one embodiment, the 2×2 user-defined scaling matrices are not defined for the chroma component of sequences in the 4:4:4 or 4:2:0 color format. Also, for the 4:0:0 color format (i.e., only one color component), the 2×2 user defined scaling matrices are not defined or not signaled.

In another embodiment, the user defined smaller size quantization matrices of size M×N (where M and N be any even number between 2 and 64) are defined and sent, which are used to derive the $2^p \times 2^k$ quantization matrices for $2^p \times 2^k$ transform units, where p and k can take any value between 1 and 6.

In another embodiment, a method is disclosed to use coefficient mapping and interpolation including simple zero order interpolation by pixel repetition and linear interpolation based up-sampling to generate the scaling matrix for $2^p \times 2^k$ (p !=k) transformed blocks (e.g. 4×8, 8×4, 4×16, 16×4, 4×32, 32×4, 8×16, 16×8, 8×32, 32×8, 16×32, 32×16, 16×64, 64×16, 32×64, 64×32) from the M×N quantization matrices, without sending any bits.

In this embodiment, for example, at decoder side, a plurality sizes of base scaling matrices are signaled and received. One of the base scaling matrices is selected (at least not larger than the transform blocks). To generate a target scaling matrix for a M×N transform block, first, the abovementioned up-sampling methods may be applied to the base scaling matrix to generate an M×M matrix. Then, the target scaling matrix is derived from the M×M scaling matrix by sub-sampling the M×M scaling matrix to an M×N or N×M scaling matrix as the target scaling matrix. For example, if a received transform block size is 32×8, then an 8×8 base scaling matrix is selected. Then, by using pixel repetition or linear interpolation, a 32×32 scaling matrix is generated from the 8×8 base scaling matrix. Sub-sampling is then applied to the 32×32 scaling matrix so that a 32×8 scaling matrix is generated. Methods of sub-sampling may vary, for instance, one sub-sampling method may include taking every $M/2^p$th and $M/2^k$ th coefficient in columns and rows respectively in the M×M scaling matrix, wherein M equals $2^p$ and N equals $2^k$. This embodiment corresponds to setting M1 and N1 to M in FIG. 6.

In yet another embodiment, a method is disclosed to use linear combination of corresponding coefficients, matrix multiplication, linear/nonlinear regression, etc. to generate the user defined quantization matrix for different transformed blocks obtained by applying AMT from the default M×N quantization matrices, without sending any additional bits.

In yet another embodiment, a method is disclosed to use linear combination of corresponding coefficients, matrix multiplication, linear/nonlinear regression, etc. to generate the user defined quantization matrix for Inter transformed blocks obtained from the default M×N quantization matrices for Intra transform blocks, without sending any additional bits.

Methods for Generating Smaller Size M×N Quantization Matrices

Methods to generate smaller size M×N quantization matrices for M×N transform units are disclosed, where M and N can be any even number between 2 and 64, from bigger $2^p \times 2^k$ matrices, where p and k can take any value between 1 and 6.

In one embodiment, the method always keeps the DC coefficient and subsample the M×N matrices in a fixed interval.

In another embodiment, the method always keeps the DC coefficient and subsample the M×N matrices in a small interval in low frequency coefficients and subsample the M×N matrices in a big interval in high frequency coefficients.

In yet another embodiment, the method always keeps the DC coefficient and the low frequency part of the M×N matrices, which has the same size of the target smaller size matrices.

Methods to Derive Big Size $2^p \times 2^k$ Quantization Matrices

Methods to derive big size $2^p \times 2^k$ quantization matrices are disclosed, where p and k can take any value between 1 and 6. The $2^p = 2^k$ quantization matrices correspond to smaller size M×N quantization matrices generated by different subsampling methods described as above for the smaller size M×N quantization matrices, where M and N can be any even number between 2 and 64.

In one embodiment, the up-sampling method uses fixed interval interpolation and/or repetition. In cases when p!=k, (i.e., non-square transform), the number of interpolated coefficients in horizontal and vertical direction is equal to $2^p/M$ and $2^k/N$ respectively, where ($2^p$ and M) and ($2^k$ and N) correspond the number of rows and the number of columns in the target and signaled matrices respectively.

In another embodiment, the up-sampling method uses smaller interval interpolation and /or repetition for low frequency coefficients and uses bigger interval interpolation and /or repetition for high frequency coefficients.

In yet another embodiment, the smaller size M×N matrices (M and N be any even number between 2 and 64) are used as the low frequency part of the big size $2^p \times 2^k$ quantization matrices (p and k be any value between 1 and 6) and the high frequency coefficients are generated based on a fixed pattern. In one embodiment, one can start from the end of low frequency part and increase the coefficient value with a fixed number with the increase of the frequency.

Methods to Derive M×N Quantization Matrices Corresponding to M×N Transform Units Methods to derive M×N quantization matrices corresponding to M×N transform units are disclosed (M and N be any numbers between 2 and 64) for the cases that matrix for Inter prediction is defined from the corresponding matrix for Intra prediction.

In one embodiment, different quantization matrices for Inter prediction transform blocks can be obtained depending on the size of the transform unit. In other words, all matrices for Inter prediction are defined from the corresponding quantization matrices for Intra prediction by applying methods such as linear combination of corresponding coefficients, matrix multiplication, linear/nonlinear regression, etc. to the corresponding elements of the matrices for Intra blocks.

In another embodiment, only certain quantization matrices for Inter prediction transform blocks are obtained from the corresponding quantization matrices for Intra prediction by applying methods such as linear combination of corresponding coefficients, matrix multiplication, linear/nonlinear regression, etc. to the corresponding elements of the matrices for Intra blocks. All rectangular matrices for Inter transform blocks may be obtained from the corresponding square quantization matrices for Inter transform blocks, by applying the default quantization matrices representation disclosed above.

Methods to Derive M×N Quantization Matrices Corresponding to M×N Transform Units for AMT Methods to derive M×N quantization matrices corresponding to M×N transform units (M and N be any even numbers between 2 and 64) for the case when AMT is applied to residual signal (e.g. depending on different prediction modes). In this case, different quantization/scaling matrices may be applied depending on the transform type, such that it will be aligned to the energy compaction after the transform.

In one embodiment, different scaling matrices can be defined depending on the prediction mode (i.e., Inter or Intra prediction) independent of the transform types in AMT applied to the residual block.

In another embodiment, separate matrices can be obtained for block sizes smaller than K, where K can take any value from 4 to 32. For all remaining transform block sizes, same quantization matrices are used independent of the transform applied to the residual block.

In yet another embodiment, different scaling matrices are obtained for luma and chroma component, independent of the transform types in AMT applied to the residual block.

In another embodiment, transforms allowed in AMT are DST-1, DST-7, and DCT-8 and different scaling/quantization matrices can be defined for each transform, including DCT-2. The scaling/quantization matrices can be applied after horizontal and vertical transformation step.

In another embodiment, the transforms allowed include DST-1, DST-7, and DCT-8 and different scaling matrices may be computed for all combinations of DCT-2, DST-1, DST-7, and DCT-8 transforms based on the relation between these transforms.

In yet another embodiment, only a few scaling matrices are defined for the basic set of transforms (e.g. DCT-2, DST-1, DST-7, and DCT-8) and scaling matrices for the result of combination of the basis transforms may be defined by linear combination, matrix multiplication, permutation, sign changes, flipping, or any combination of these transformations of the basis scaling matrices.

In another embodiment, scaling matrices may be defined and signaled for a subset of basic transforms, (e.g. DCT-2, or DCT-2 and DST-7) and scaling matrices for the rest of the transforms (e.g. for DST-7, DST-1, and DCT-8, or for DST-1 and DCT-8) may be defined by linear combination, matrix multiplication, permutation, sign changes, flipping, or any combination of these transformations of the basis scaling matrices. In one example, the derivation process is dependent on the relationship between the defined transform type and the target transform type. In another example, the derivation process is dependent on the relationship between the defined transform coefficients and the target transform coefficients.

Any combination of the abovementioned methods of scaling matrices derivation can be used.

Option for Default Quantization Matrices Choices

A scheme is disclosed to provide the option for a user to decide between either default quantization matrices, or user defined quantization matrices, or use residual coding without any quantization applied (e.g., PCM transform/quantization bypass mode).

Zero-out Process Applied with Scaling Matrices Generation

In one embodiment, an M×N scaling matrix set is used to quantize TUs with size larger than M×N if zero out is applied. In other words, all scaling matrix entries with row numbers larger than P are set to zero and all scaling matrix entries with column numbers larger than Q are set to zero. P and Q can be both smaller than CU width and CU height, only P smaller than CU width, or only Q smaller than CU height. For example, a 32×32 scaling matrix set is used to quantize 64×64 TUs if zero-out is applied to CU row larger than 32 and column larger than 32. In another example, a 32×4 scaling matrix set is used to quantize 64×4 TUs if zero-out is applied to CU column larger than 32. In another embodiment, an M×N scaling matrices set is used to quantize M×N TUs. The values in scaling matrices outside row P and column Q are assigned to zero. P and Q can be both smaller than M and N, only P smaller than M, or only Q smaller than N. For example, a 64×64 TU is quantized with a 64×64 scaling matrix. However, the values in range outside 32×32 are set to zero. In other words, the range outside 32×32 will be zeroed out in the quantization process. In another example, a 64×4 TU is quantized with a 64×4 scaling matrix. However, the values in range outside of the top-left 32×4 are zeroed out in the scaling matrix. In other words, the range outside 32×4 will be zeroed out in the quantization process.

In another embodiment, a method is disclosed to use coefficient up-sampling, coefficient mapping and interpolation (e.g., simple zero order interpolation by pixel repetition and linear interpolation based up-sampling) to generate the quantization matrix for $2^P \times 2^k$ with p!=k (e.g. 4×8, 8×4, 4×16, 16×4, 4×32, 32×4, 8×16, 16×8, 8×32, 32×8, 16×32, 32×16, 16×64, 64×16, 32×64, 64×32) and $2^P \times 2^k$ with p=k (e.g. 16×16, 32×32, 64×64) transformed block from the smaller M×N (e.g. 4×4, 8×8) quantization matrices, without sending any bits. A smaller number of smaller M×N quantization matrices need to be decoded when zero out is applied. For example, a 64×64 TU needs 64×64 scaling matrices for quantization. The 64×64 scaling matrices can be generated from 8×8 quantization matrices by up-sampling. When zero out is applied to 64×64 TUs, only 4×4 quantization matrices are needed to be signaled to generate the 64×64 scaling matrices because the range outside 32×32 in the 64×64 scaling matrices will be always zero. Therefore, for the 64×64 TU scaling matrix, it only needs to signal a 4×4 matrix. In one example, only the 64×64 TU scaling matrix is derived from the 4×4 matrix. For 64×N or M×64 TU scaling matrix, it is up-sampled from 32×N or M×32 TU scaling matrix.

In yet another embodiment, after decoding the smaller M×N quantization matrices, the M×N quantization matrices are up-sampled to P×Q when zero out is applied on row P and column Q. For example, a 64×64 TU needs 64×64 scaling matrices for quantization. The 64×64 scaling matrices are generated from 8×8 quantization matrices by up-sampling. When zero out is applied on row 32 and column 32 of the 64×64 TUs, the 8×8 quantization matrices will be up-sampled to 32×32 and the range outside row 32 or column 32 will be filled with zero. Therefore, for scaling matrixes for both 32×32 TU and 64×64 TU, an 8×8 matrix is signaled. For the 64×64 TU scaling matrix, an 8×8 matrix is used and up-sampled to a 64×64 matrix. The scaling matrix values outside of the top-left 32×32 are all zeroed out. In one example, only the 64×64 scaling matrix is derived from the 8×8 matrix. For 64×N or M×64 scaling matrix, the 64×64 scaling matrix is up-sampled from a 32×N or M×32 scaling matrix.

Default Quantization Matrices for Multiple Transform Set (MTS)

When multiple transform set (MTS) is applied, the coefficients zero out for the transformed coefficients outside of the top-left 16×16 region is also applied. If the scaling matrix for default transform (e.g. DCT-2 transform) and MTS are shared, the same scaling matrix signaling and up-sampling process can be applied. However, if the scaling matrix for default and MTS can be different, the different scaling matrix signaling or different up-sampling process are applied. In one example, for a 32×32 TU, if the MTS is applied, the coefficients outside the top-left 16×16 region are zeroed out. Therefore, only a 16×16 scaling matrix is required for the 32×32 TU with MTS. In one embodiment, an M×N matrix (e.g. an 8×8 matrix) is signaled. The M×N can be the same size as the signaled matrix size for 32×32 default transform TU. This M×N matrix is up-sampled to be a 16×16 matrix for this 32×32 TU with MTS. In another embodiment, an M×N matrix (e.g. a 4×4 matrix) is signaled. The M×N can be smaller than the size of the signaled matrix size for 32×32 default transform TU. This M×N matrix is up-sampled to a 16×16 matrix for this 32×32 TU with MTS.

In another embodiment, the bottom-right region (e.g. 4×4) in a signaled matrix (e.g. an 8×8 matrix) can be skipped for signaling in some cases when zero out is applied. For example, for 32×32 TU, if the MTS is applied, the coefficients outside of the top-left 16×16 region are zeroed out. Therefore, elements in the bottom-right 4×4 region of the base scaling matrix are never used so that they don't need to be signaled in the bitstream. In another embodiment, an M×N matrix (e.g. a 4×4 matrix) is signaled. The M×N can be smaller than the size of the signaled matrix size for 32×32 default transform TU. This M×N matrix is up-sampled to be a 16×16 matrix for this 32×32 TU with MTS.

Variants of Scaling Matrix Generation

In another embodiment, even when the coefficient zero-out is applied, a base scaling matrix with the size the same as the TU is still generated. For example, for a 64×64 TU, even though the coefficient zero-out is applied, only the top-left 32×32 coefficients are meaningful, a 64×64 base scaling matrix is still generated. This 64×64 base scaling matrix can be used to generate the scaling matrix of M×64 or 64×N. In one example, in the generated scaling matrix, the entry values for the zero-out coefficient band can be zero.

In another example, for the M×N or N×M scaling matrix, where M is larger than N, it is derived from an M×M matrix and down-sampled to the M×N or N×M matrix. In another example, for the M×N or N×M scaling matrix, where M is larger than N, it is derived from an N×N matrix and up-sampled to the M×N or N×M matrix.

In another embodiment, when the coefficient zero out is applied, the elements in the base scaling matrix corresponding to the zero-out region are not signaled. For example, for a 64×64 TU with the coefficient zero-out applied, only the top-left 32×32 coefficients are meaningful. Then only top-left 4×4 elements in the base scaling matrix are signaled. In another example, rectangular scaling matrices are supported, e.g. 64×32, 16×64, etc. In this case, elements in the bottom-right 4×4 region of the base scaling matrix are never used and original values of these elements never need to be signaled or these elements in bottom-right 4×4 region can be set to zero in the bitstream. In one embodiment, the above mentioned zero-out procedure is applied to signaling quantization matrices for a certain color component of sequences in the 4:4:4 or 4:2:0 format. In one embodiment, the above mentioned zero-out procedure is applied to signaling 8×8 scaling matrices used for defining M×N (e.g. 64×64, 64×32, 64×16, 64×N, N×64, etc.) scaling matrices for TBs of a certain color component, in which the high frequency parts are zeroed out.

In one embodiment, same signaling method with zero-out is applied to scaling matrices used for chroma component of sequences in the 4:4:4 or 4:2:0 color format for the defined M×N scaling matrices. In other words, only three 4×4 matrices (i.e., top-left, top-right and bottom-left) are signaled for the luma and three 4×4 matrices (i.e., top-left, top-right and bottom-left) are signaled for every 8×8 chroma scaling matrix used for defining corresponding M×N luma and chroma scaling matrices with zero-out respective. In another embodiment, if the 4:0:0 color format (i.e., only one color component) is used, the scaling matrix signaling for chroma components (or the 2nd/3rd color component) is disabled.

In one embodiment, Intra block copy mode uses the scaling matrices used in Inter mode.

In another embodiment, Intra block copy mode uses the scaling matrices used in Intra mode.

In another embodiment, Intra block copy mode has another set of scaling matrices, which is different from those used in Inter mode and Intra mode.

Quantization Matrices Signaling

The information related to scaling matrices can be signaled in the sequence parameter set (SPS) and further updated in the picture parameter set (PPS). A frequency dependent scaling can be enabled by using the syntax element scaling_list_enabled_flag in SPS. When this flag is enabled, additional flags in SPS and PPS control whether the default quantization matrices or non-default quantization matrices are used.

Non-default quantization matrices can also be optionally transmitted in the bitstream in sequence parameter sets (SPS) or picture parameter sets (PPS).

In JVET-P2001 (J. Bross, et al., "Versatile Video Coding (Draft 7)", Joint Video Experts Team (JVET) of ITU-T SG 16 WP 3 and ISO/IEC JTC 1/SC 29/WG 11, 16th Meeting: Geneva, CH, 1-11 Oct. 2019, Document: JVET-P2001), the quantization matrices related syntax are shown below in Table 3.

TABLE 3

| Scaling list data syntax | |
|---|---|
| scaling_list_data( ) { | Descriptor |
|   scaling_matrix_for_lfnst_disabled_flag | u(1) |
|   for( id = 0; id < 28; id ++ ) | |
|     matrixSize = (id < 2 ) ? 2 : ( ( id < 8 ) ? 4 : 8 ) | |
|     scaling_list_copy_mode_flag[ id ] | u(1) |
|     if( !scaling_list_copy_mode_flag[ id ] ) | |
|     scaling_list_pred_mode_flag[ id ] | u(1) |
|     if( ( scaling_list_copy_mode_flag[ id ] \|\| | |
|     scaling_list_pred_mode_flag | |
|     [ id ] ) && | |
|      id != 0 && id != 2 && id != 8 ) | |
|     scaling_list_pred_id_delta[ id ] | ue(v) |
|     if( !scaling_list_copy_mode_flag[ id ] ) { | |
|     nextCoef = 0 | |
|     if( id > 13) { | |
|      scaling_list_dc_coef[ id – 14 ] | se(v) |
|      nextCoef += scaling_list_dc_coef[ id – 14 ] | |
|     } | |
|     for( i = 0; i < matrixSize * matrixSize; i++ ) { | |
|      x = DiagScanOrder[ 3 ][ 3 ][ i ][ 0 ] | |
|      y = DiagScanOrder[ 3 ][ 3 ][ i ][ 1 ] | |

TABLE 3-continued

| Scaling list data syntax | |
|---|---|
| scaling_list_data( ) { | Descriptor |
|     if( !( id > 25 && x >= 4 && y >= 4 ) ) { | |
|      scaling_list_delta_coef[ id ][ i ] | se(v) |
|      nextCoef += scaling_list_delta_coef[ id ][ i ] | |
|     } | |
|     ScalingList[ id ][ i ] = nextCoef | |
|     } | |
|    } | |
|   } | |
| } | |

1-D scaling matrices IDs, as shown in Table 4, are used to indicate the corresponding scaling matrices for the coded transform blocks as follows.

TABLE 4

| | 1-D scaling matrices IDs | | | | | | |
|---|---|---|---|---|---|---|---|
| max(nTbW, nTbH) | | 2 | 4 | 8 | 16 | 32 | 64 |
| predMode = | cIdx = 0 (Y) | | 2 | 8 | 14 | 20 | 26 |
| MODE_INTRA | cIdx = 1 (Cb) | | 3 | 9 | 15 | 21 | 21 |
| | cIdx = 2 (Cr) | | 4 | 10 | 16 | 22 | 22 |
| predMode = | cIdx = 0 (Y) | | 5 | 11 | 17 | 23 | 27 |
| MODE_INTER | cIdx = 1 (Cb) | 0 | 6 | 12 | 18 | 24 | 24 |
| (INTER, IBC) | cIdx = 2 (Cr) | 1 | 7 | 13 | 19 | 25 | 25 |

Quantization Matrices Signaling for Color Video Data

In order to improve coding efficiency for the chroma component, a signaling method in the present invention proposes to skip chroma quantization matrices signaling for video coding in VVC if the current chroma format is monochrome. In one embodiment, a syntax is signaled in each APSs with APS type (e.g., aps_type) equal to a scaling list (e.g., SCALING_LIST). The syntax (e.g., aps_chroma_format_idc) specifies the chroma sampling relative to the luma sampling as specified in the following table. As shown in Table 5, aps_chroma_format_idc is included in the syntax table. The corresponding chroma format index associated with aps_chroma_format_idc (i.e., chroma_format_idc) is shown in Table 6. It is a requirement of bitstream conformance that the value of aps_chroma_format_idc shall be the same as chroma_format_idc, which is shown in Table 6.

TABLE 5

| Proposed scaling list data syntax | |
|---|---|
| scaling_list_data( ) { | Descriptor |
|   scaling_matrix_for_lfnst_disabled_flag | u(1) |
|     aps_chroma_format_idc | ue(v) |
|   for( id = 0; id < 28; id ++ ) | |
|     matrixSize = (id < 2 ) ? 2 : ( ( id < 8 ) ? 4 : 8 ) | |
|     scaling_list_copy_mode_flag[ id ] | u(1) |
|     if( !scaling_list_copy_mode_flag[ id ] ) | |
|     scaling_list_pred_mode_flag[ id ] | u(1) |
|     if( ( scaling_list_copy_mode_flag[ id ] \|\| | |
|     scaling_list_pred_mode_flag [ id ] ) | |
|     && | |
|      id != 0 && id != 2 && id != 8 ) | |
|     scaling_list_pred_id_delta[ id ] | ue(v) |
|     if( !scaling_list_copy_mode_flag[ id ] ) { | |
|     nextCoef = 0 | |
|     if( id > 13) { | |
|      scaling_list_dc_coef[ id – 14 ] | se(v) |
|      nextCoef += scaling_list_dc_coef[ id – 14 ] | |
|     } | |

TABLE 5-continued

Proposed scaling list data syntax

| scaling_list_data( ) { | Descriptor |
|---|---|
| for( i = 0; i < matrixSize * matrixSize; i++) { | |
| x = DiagScanOrder[ 3 ][ 3 ][ i ][ 0 ] | |
| y = DiagScanOrder[ 3 ][ 3 ][ i ][ 1 ] | |
| if( !( id > 25 && x >= 4 && y >= 4 ) ) { | |
| scaling_list_delta_coef[ id ][ i ] | se(v) |
| nextCoef += scaling_list_delta_coef[ id ][ i ] | |
| } | |
| ScalingList[ id ][ i ] = nextCoef | |
| } | |
| } | |
| } | |
| } | |

TABLE 6

Mapping for chroma_format_idc

| chroma_format_idc | separate_colour_plane_flag | Chroma format | SubWidthC | SubHeightC |
|---|---|---|---|---|
| 0 | 0 | Monochrome | 1 | 1 |
| 1 | 0 | 4:2:0 | 2 | 2 |
| 2 | 0 | 4:2:2 | 2 | 1 |
| 3 | 0 | 4:4:4 | 1 | 1 |
| 3 | 1 | 4:4:4 | 1 | 1 |

In one embodiment, all scaling matrices for the chroma component can be skipped for signaling if the current chroma format is monochrome.

In one embodiment, only the scaling matrices with IDs satisfy the following condition can be signaled if aps_chroma_format_idc is equal to 0.

ScalingMatrixID % 3==2||ScalingMatrixID==27.

In another embodiment, the above equation can be rewritten as:

ScalingMatrixID % 3==2||ScalingMatrixID>25.

In yet another embodiment, the equation can be:

ScalingMatrixID % 3==2||ScalingMatrixID>=26.

In the above equations, ScalingMatrixID corresponds to the 1-D scaling matrices IDs as defined in Table 4. In one embodiment, the scaling matrices APSs with aps_chroma_format_idc equal to 0 only can be referenced by other dependent video layer not including a chroma component (e.g. aps_chroma_format_idc==0 or chroma_format_idc==0).

In one embodiment, the scaling matrices APSs with aps_chroma_format_idc equal to 0 cannot be referenced by other video layers with chroma components. (e.g. chroma_format_idc!=0).

In one embodiment, the scaling matrices APSs of a layer including the chroma scaling list cannot be referenced other video layers without chroma components (e.g. chroma_format_idc==0).

In one embodiment, if the aps_chroma_format_idc or APS doesn't include the chroma scaling list, it cannot be referenced by other video layers with chroma components (e.g. chroma_format_idc !=0).

In one embodiment, the scaling matrices APSs can be referenced by other dependent video layer if the aps_chroma_format_idc of an APS is smaller than or equal to the chroma_format_idc of the dependent video layer. For example, if aps_chroma_format_idc of an APS is equal to 0, the chroma_format_idc of the dependent video layer can be any value. In another example, if the aps_chroma_format_idc of an APS is equal to 1, the chroma_format_idc of the dependent layer can be 1, 2, or 3.

In one embodiment, as shown in Table 7, the syntax aps_chroma_param_present_flag is signaled in each APSs with aps_type equal to SCALING_LIST to indicate the scaling matrices for chroma being signaled or not, as shown in the following table. aps_chroma_param_present_flag equal to 1 specifies that the scaling matrices for chroma is present in the APS. aps_chroma_param_present_flag equal to 0 specifies that the scaling matrices for chroma is not present in the APS. It is a requirement of bitstream conformance that the value of aps_chroma_param_present_flag shall be equal to 0, if the chroma_format_idc is equal to 0.

TABLE 7

Proposed scaling list data syntax

| scaling_list_data( ) { | Descriptor |
|---|---|
| scaling_matrix_for_lfnst_disabled_flag | u(1) |
| aps_chroma_param_present_flag | u(1) |
| for( id = 0; id < 28; id ++) { | |
| if (aps_chroma_param_present_flag || (id % 3 ==2 || id ==27)) { | |
| matrixSize = (id < 2 ) ? 2 : ( ( id < 8 ) ? 4 : 8 ) | |
| scaling_list_copy_mode_flag[ id ] | u(1) |
| if( !scaling_list_copy_mode_flag[ id ] ) | |
| scaling_list_pred_mode_flag[ id ] | u(1) |
| if( ( scaling_list_copy_mode_flag[ id ] || scaling_list_pred_mode_flag [id] ) && | |
| id != 0 && id != 2 && id != 8 ) | |
| scaling_list_pred_id_delta[ id ] | ue(v) |
| if( !scaling_list_copy_mode_flag[ id ] ) { | |
| nextCoef = 0 | |
| if( id > 13 ) { | |
| scaling_list_dc_coef[ id − 14 ] | se(v) |
| nextCoef += scaling_list_dc_coef[ id − 14 ] | |
| } | |
| for( i = 0; i < matrixSize * matrixSize; i++) { | |
| x = DiagScanOrder[ 3 ][ 3 ][ i ][ 0 ] | |
| y = DiagScanOrder[ 3 ][ 3 ][ i ][ 1 ] | |
| if( !( id > 25 && x >= 4 && y >= 4 ) ) { | |
| scaling_list_delta_coef[ id ][ i ] | se(v) |
| nextCoef += scaling_list_delta_coef[ id ][ i ] | |
| } | |
| ScalingList[ id ][ i ] = nextCoef | |
| } | |
| } | |
| } | |
| } | |
| } | |

The "if condition: (aps_chroma_param_present_flag ||(id % 3==2||id==27))" in the above embodiment can be replaced by (aps_chroma_param_present_flag||(id % 3==2||id>25)) or (aps_chroma_param_present_flag||(id % 3==2||id>=26)).

In one embodiment, the scaling matrices APSs with aps_chroma_param_present_flag equal to 0 only can be referenced by other dependent video layer not including chroma component (e.g. aps_chroma_param_present_flag==0, or chroma_format_idc==0).

In one embodiment, the scaling matrices APSs with aps_chroma_param_present_flag equal to 0 cannot be referenced by other video layers with chroma components (e.g. chroma_format_idc!=0).

In one embodiment, the above methods can be also applied to APSs with aps_type equal to LMCS, SCALING_LIST, and ALF.

In another embodiment, some of scaling matrices used in Intra block copy mode are the same as those used in Inter mode, and others are the same as those used in Intra mode. The selection can be implicit selection, (e.g., dependent on the size, quantization parameter, tile group type), or explicit selection (e.g., signaling the selection at sequence level, picture level, tile group level, tile level, or block level).

Any of the foregoing proposed methods can be implemented in various hardware, software realizations of encoders and/or decoders, or a combination of thereof. For example, an embodiment of the present invention can be one or more circuits integrated into a video compression chip or program code integrated into video compression software to perform the processing described herein. For example, any of the proposed methods can be implemented as a circuit coupled to a quantization module and an inverse quantization module of the encoder, and can be implemented as a circuit coupled to an inverse quantization module of the decoder. In one embodiment, any of the proposed methods can be implemented in a quantization module and an inverse quantization module of an encoder, and can be implemented in an inverse quantization module of a decoder.

Syntaxes Design

In this invention, a set of syntaxes is disclosed for signaling of the present invention, where the syntaxes can be signaled in SPS (sequence parameter set RBSP syntax), PPS (picture parameter set RBSP syntax), slice, tile, CTU, and CU header to signal the quantization matrix to the decoder.

In one embodiment, a sequence level, "seq_quant_matrix_present_flag" is used in SPS to signal whether the whole sequence will use quantization matrix or not. In one embodiment, if "seq_quant_matrix_present_flag" is true, another syntax, "seq_quant_matrix_present_idx" is checked for each transform size and each channel (Y,U,V) to determine whether the specified transform size and each channel will use quantization matrix or not. In one embodiment, if "seq_quant_matrix_present_idx" is true, another syntax, "use_default_seq_quant_matrix" is checked to determine whether if the default quantization matrix will be used. In one embodiment, if "use_default_seq_quant_matrix" is signaled, the default quantization matrix will be used. In this case, the default quantization matrices are read from the memory, and the remaining square, rectangle quantization matrices, bigger quantization matrices and quantization matrices for all cases of AMT will be implicitly generated from the default quantization matrices. In one embodiment, if "use_default_seq_quant_matrix" is false, the sequence level quantization matrices are explicitly generated by coding methods such as the prediction based entropy coding.

In another embodiment, a picture-level syntax, "pic_quant_matrix_present_flag" is used in PPS to signal whether the current picture will use quantization matrix or not. The following syntax can then be added either in PPS, slice, tile, CTU, or CU level. In one embodiment, if "pic_quant_matrix_present_flag" is true, another syntax, "pic_quant_matrix_present_idx" is checked for each prediction mode, transform, transform size and each channel (Y,U,V) to determine whether the specified prediction mode, transform, transform size and each channel will use quantization matrix or not. In one embodiment, if "pic_quant_matrix_present_idx" is true, another syntax, "use_seq_quant_matrix_flag" is checked to determine whether the sequence level quantization matrix will be used. In one embodiment, if "pic_quant_matrix_present_idx" is not true, for certain prediction modes and small transform sizes, the quantization matrices are explicitly generated by coding methods such as the prediction based entropy coding. In one embodiment, for the rectangle and bigger transform sizes, syntax, "use_implicit_quant_matrix" is checked. If it is true, the quantization matrix is implicitly generated by methods such as the proposed methods in the contents. Otherwise, the quantization matrix is explicitly generated by coding methods such as the prediction based entropy coding.

Video encoders have to follow the foregoing syntax design so as to generate the legal bitstream, and video decoders are able to decode the bitstream correctly only if the parsing process complies with the foregoing syntax design. When the syntax is skipped in the bitstream, encoders and decoders should set the syntax value as an inferred value to guarantee the encoding and decoding results are matched.

Figure 10:
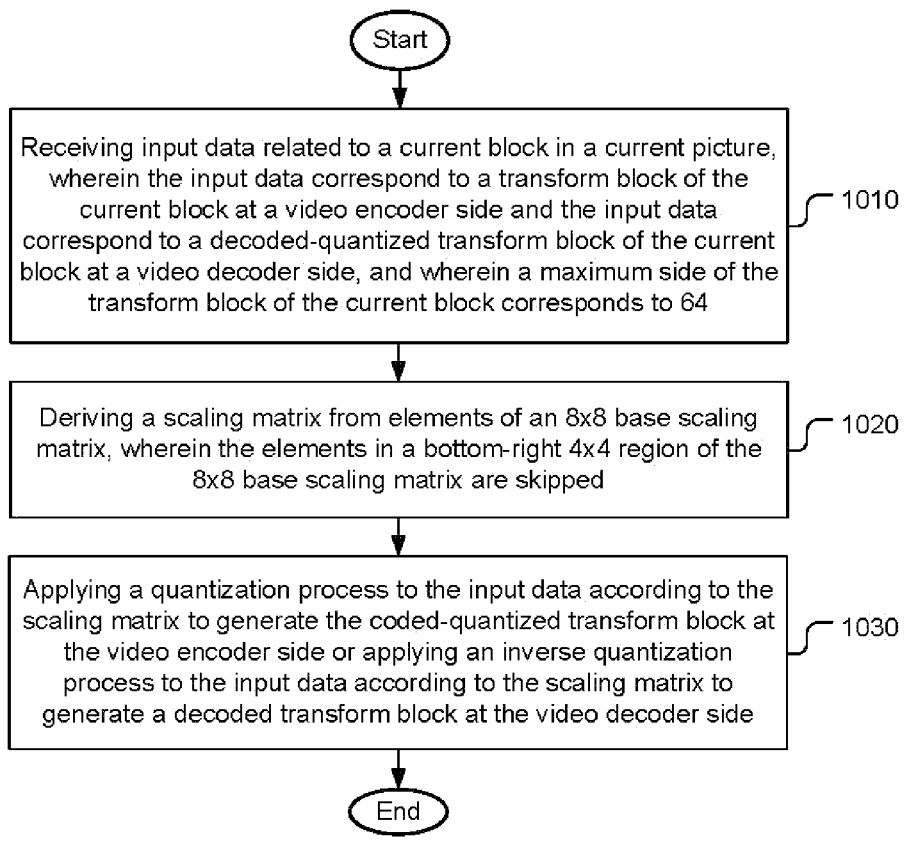
FIG. 10 illustrates a flowchart of an exemplary coding system using scaling matrix derivation method according to an embodiment of the present invention.

FIG. 10 illustrates a flowchart of an exemplary coding system using scaling matrix derivation according to an embodiment of the present invention. The steps shown in the flowchart may be implemented as program codes executable on one or more processors (e.g., one or more CPUs) at the encoder side. The steps shown in the flowchart may also be implemented based hardware such as one or more electronic devices or processors arranged to perform the steps in the flowchart. According to this method, input data related to a current block in a current picture are received in step 1010, wherein the input data correspond to a transform block of the current block at a video encoder side and the input data correspond to a decoded-quantized transform block of the current block at a video decoder side, and wherein a maximum side of the transform block of the current block corresponds to 64. In step 1020, a scaling matrix is derived from elements of an 8×8 base scaling matrix, wherein the elements in a bottom-right 4×4 region of the 8×8 base scaling matrix are skipped, either not signaled or set to zero. In step 1030, a quantization process is applied to the input data according to the scaling matrix to generate the coded-quantized transform block at the video encoder side or an inverse quantization process is applied to the input data according to the scaling matrix to generate a decoded transform block at the video decoder side.

Figure 11:
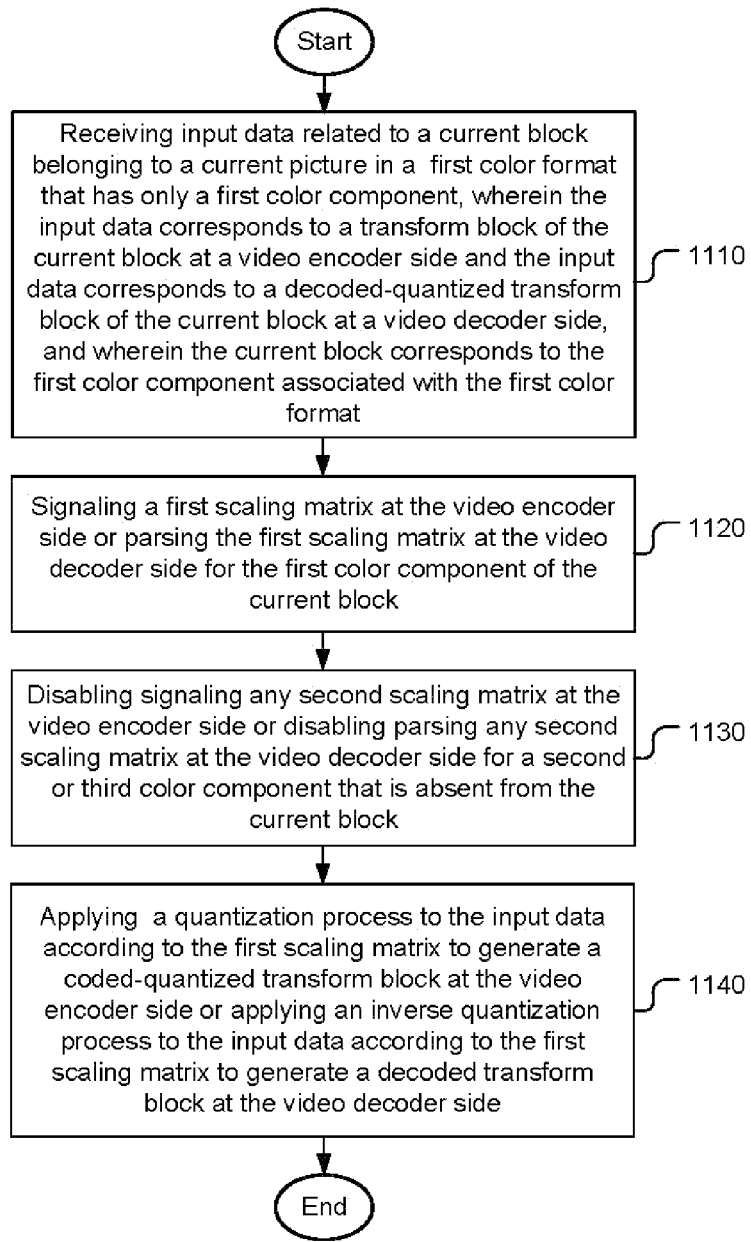
FIG. 11 illustrates a flowchart of an exemplary coding system using another scaling matrix derivation method according to an embodiment of the present invention.

FIG. 11 illustrates a flowchart of an exemplary coding system using scaling matrix derivation method according to an embodiment of the present invention. According to this method, input data related to a current block belonging to a current picture in a first color format that has only a first color component are received in step 1110, wherein the input data corresponds to a transform block of the current block at a video encoder side and the input data corresponds to a decoded-quantized transform block of the current block at a video decoder side, and wherein the current block corresponds to the first color component associated with the first color format. In step 1120, a first scaling matrix is signaled at the video encoder side or the first scaling matrix is parsed at the video decoder side for the first color component of the current block. In step 1130, signaling any second scaling matrix at the video encoder side or parsing any second scaling matrix at the video decoder side is disabled for a second or third color component that is absent from the current block. In step 1140, a quantization process is applied to the input data according to the first scaling matrix to generate a coded-quantized transform block at the video encoder side or an inverse quantization process is applied to the input data according to the first scaling matrix to generate a decoded transform block at the video decoder side.

The flowchart shown is intended to illustrate an example of video coding according to the present invention. A person skilled in the art may modify each step, re-arranges the steps, split a step, or combine steps to practice the present invention without departing from the spirit of the present invention. In the disclosure, specific syntax and semantics have been used to illustrate examples to implement embodiments of the present invention. A skilled person may practice the present invention by substituting the syntax and semantics with equivalent syntax and semantics without departing from the spirit of the present invention.

The above description is presented to enable a person of ordinary skill in the art to practice the present invention as provided in the context of a particular application and its requirement. Various modifications to the described embodiments will be apparent to those with skill in the art, and the general principles defined herein may be applied to other embodiments. Therefore, the present invention is not intended to be limited to the particular embodiments shown and described, but is to be accorded the widest scope consistent with the principles and novel features herein disclosed. In the above detailed description, various specific details are illustrated in order to provide a thorough understanding of the present invention. Nevertheless, it will be understood by those skilled in the art that the present invention may be practiced.

Embodiment of the present invention as described above may be implemented in various hardware, software codes, or a combination of both. For example, an embodiment of the present invention can be one or more circuit circuits integrated into a video compression chip or program code integrated into video compression software to perform the processing described herein. An embodiment of the present invention may also be program code to be executed on a Digital Signal Processor (DSP) to perform the processing described herein. The invention may also involve a number of functions to be performed by a computer processor, a digital signal processor, a microprocessor, or field programmable gate array (FPGA). These processors can be configured to perform particular tasks according to the invention, by executing machine-readable software code or firmware code that defines the particular methods embodied by the invention. The software code or firmware code may be developed in different programming languages and different formats or styles. The software code may also be compiled for different target platforms. However, different code formats, styles and languages of software codes and other means of configuring code to perform the tasks in accordance with the invention will not depart from the spirit and scope of the invention.

The invention may be embodied in other specific forms without departing from its spirit or essential characteristics. The described examples are to be considered in all respects only as illustrative and not restrictive. The scope of the invention is therefore, indicated by the appended claims rather than by the foregoing description. All changes which come within the meaning and range of equivalency of the claims are to be embraced within their scope.

The invention claimed is:

1. A method of video coding, the method comprising:
receiving input data related to a current block in a current picture, wherein the input data correspond to a transform block of the current block at a video encoder side and the input data correspond to a decoded-quantized transform block of the current block at a video decoder side, and wherein a maximum side of the transform block of the current block corresponds to 64;
deriving a scaling matrix from elements of an 8×8 base scaling matrix, wherein when zero out is applied, signaling of the elements in a bottom-right 4×4 region of the 8×8 base scaling matrix is skipped; and
applying a quantization process to the input data according to the scaling matrix to generate a coded-quantized transform block at the video encoder side or applying an inverse quantization process to the input data according to the scaling matrix to generate a decoded transform block at the video decoder side.

2. The method of claim 1, wherein when the coded-quantized transform block at the video encoder side or the decoded transform block at the video decoder side is 64×64 in size, the transform block has 32×32 non-zero value elements.

3. The method of claim 1, wherein when the coded-quantized transform block at the video encoder side or the decoded transform block at the video decoder side is 64×N or N×64 in size, the transform block has 32×N or N×32 non-zero value elements, and wherein N is an integer smaller than 64.

4. An apparatus of video coding, the apparatus comprising one or more electronic circuits or processors arranged to:
receive input data related to a current block in a current picture, wherein the input data correspond to a transform block of the current block at a video encoder side and the input data correspond to a decoded-quantized transform block of the current block at a video decoder side, and wherein a maximum side of the transform block of the current block corresponds to 64;
derive a scaling matrix from elements of an 8×8 base scaling matrix, wherein when zero out is applied, signaling of the elements in a bottom-right 4×4 region of the 8×8 base scaling matrix arc is skipped; and
apply a quantization process to the input data according to the scaling matrix to generate a coded-quantized transform block at the video encoder side or apply an inverse quantization process to the input data according to the scaling matrix to generate a decoded transform block at the video decoder side.

5. A method of video coding, the method comprising:
receiving input data related to a current block belonging to a current picture in a first color format that has only a first color component, wherein the input data corresponds to a transform block of the current block at a video encoder side and the input data corresponds to a decoded-quantized transform block of the current block at a video decoder side, and wherein the current block corresponds to the first color component associated with the first color format;
signaling a first scaling matrix at the video encoder side or parsing the first scaling matrix at the video decoder side for the first color component of the current block;
disabling signaling any second scaling matrix at the video encoder side or disabling parsing any second scaling matrix at the video decoder side for a second or third color component that is absent from the current block; and
applying a quantization process to the input data according to the first scaling matrix to generate a coded-quantized transform block at the video encoder side or applying an inverse quantization process to the input data according to the first scaling matrix to generate a decoded transform block at the video decoder side.

6. The method of claim 5, wherein a flag is signaled in a bitstream to indicate whether said signaling any second scaling matrix at the video encoder side or said parsing any second scaling matrix at the video decoder side for the second or third color component is enabled or disabled.

7. The method of claim 6, wherein the flag is signaled in an Adaptation Parameter Set (APS) of the bitstream, and wherein the APS has a type corresponding to scaling list data.

8. The method of claim 5, wherein when one second scaling matrix is not signaled at the video encoder side or not parsed at the video decoder side, a pre-defined second scaling matrix is inferred.

9. The method of claim 8, wherein whether the pre-defined second scaling matrix is inferred is determined according to syntax elements scaling_list_copy_mode_flag and scaling_list_pred_id_delta.

10. The method of claim 9, wherein values of the syntax elements scaling_list_copy_mode_flag and scaling_list_pred_id_delta are inferred at the video decoder side if the values of the syntax elements scaling_list_copy_mode_flag and the scaling_list_pred_id_delta are not received.

11. The method of claim 5, wherein the first color format is a 4:0:0 color format, and the first color component is luma component.

12. The method of claim 5, wherein the first scaling matrix is referenced by another dependent video layer in a 4:0:0 color format.

13. The method of claim 5, wherein whether the current picture is in a 4:0:0 color format is indicated by a color format index associated with the current picture.

14. The method of claim 5, wherein the second or third color component comprises a chroma component.

15. An apparatus of video coding, the apparatus comprising one or more electronic circuits or processors arranged to:
receive input data related to a current block belonging to a current picture in a first color format that has only a first color component, wherein the input data corresponds to a transform block of the current block at a video encoder side and the input data corresponds to a decoded-quantized transform block of the current block at a video decoder side, and wherein the current block corresponds to the first color component associated with the first color format;
signal a first scaling matrix at the video encoder side or parsing the first scaling matrix at the video decoder side for the first color component of the current block;
disable signaling any second scaling matrix at the video encoder side or disabling parsing any second scaling matrix at the video decoder side for a second or third color component that is absent from the current block; and
apply a quantization process to the input data according to the first scaling matrix to generate a coded-quantized transform block at the video encoder side or applying an inverse quantization process to the input data according to the first scaling matrix to generate a decoded transform block at the video decoder side.

* * * * *